United States Patent
Kim et al.

(10) Patent No.: US 10,659,947 B1
(45) Date of Patent: May 19, 2020

(54) APPARATUS AND METHOD FOR TRANSMITTING SHELTER LOCATION INFORMATION BASED ON ATSC 3.0, AND APPARATUS AND METHOD FOR RECEIVING SHELTER LOCATION INFORMATION BASED ON ATSC 3.0

(71) Applicants: Electronics and Telecommunications Research Institute, Daejeon (KR); FOUNDATION FOR RESEARCH AND BUSINESS, SEOUL NATIONAL UNIVERSITY OF SCIENCE AND TECHNOLOGY, Seoul (KR)

(72) Inventors: Sung Hoon Kim, Daejeon (KR); Byung Jun Bae, Daejeon (KR); Dong Ho Kim, Seoul (KR); Bong Seok Seo, Uijeongbu-si (KR); Chang Jong Hyun, Seoul (KR); Eun Yeong Jeong, Seoul (KR)

(73) Assignees: Electronics and Telecommunications Research Institute, Daejeon (KR); FOUNDATION FOR RESEARCH AND BUSINESS, SEOUL NATIONAL UNIVERSITY OF SCIENCE AND TECHNOLOGY, Seoul (KR)

( * ) Notice: Subject to any disclaimer, the term of this patent is extended or adjusted under 35 U.S.C. 154(b) by 0 days.

(21) Appl. No.: 16/681,647

(22) Filed: Nov. 12, 2019

(30) Foreign Application Priority Data

Nov. 12, 2018 (KR) .......................... 10-2018-0138403
Nov. 8, 2019 (KR) .......................... 10-2019-0142658

(51) Int. Cl.
*H04W 4/90* (2018.01)
*H04H 20/57* (2008.01)
(Continued)

(52) U.S. Cl.
CPC .............. *H04W 4/90* (2018.02); *H04H 20/57* (2013.01); *H04H 20/59* (2013.01); *H04H 20/93* (2013.01);
(Continued)

(58) Field of Classification Search
CPC ........................................................ H04W 4/90
(Continued)

(56) References Cited

U.S. PATENT DOCUMENTS

2015/0312645 A1    10/2015   Lee et al.
2018/0165929 A1    6/2018    Lee et al.

FOREIGN PATENT DOCUMENTS

| KR | 100652015 B1 | 12/2006 |
|---|---|---|
| KR | 101849946 B1 | 4/2018 |
| KR | 101884667 B1 | 8/2018 |

OTHER PUBLICATIONS

"ATSC 3.0 Advanced Emergency Alert Implementation Team White Paper v0.9", Jul. 17, 2018, pp. 1-36, Advanced Television Systems Committee, Washington, D.C., USA.
(Continued)

*Primary Examiner* — Joel Ajayi
(74) *Attorney, Agent, or Firm* — William Park & Associates Ltd.

(57) ABSTRACT

An apparatus for transmitting shelter location information is disclosed. The apparatus for transmitting shelter location information according to an embodiment of the present disclosure includes a wake-up information checking unit that checks a value of a wake-up indicator provided in a head of a data file to determine whether a disaster has occurred;
(Continued)

and a shelter location information insertion unit inserting the shelter location information into an advanced emergency alert table (AEAT), as it is confirmed by the wake-up information checking unit that a disaster has occurred.

17 Claims, 9 Drawing Sheets

(51) Int. Cl.
  *H04H 20/59*   (2008.01)
  *H04W 4/024*   (2018.01)
  *H04H 60/70*   (2008.01)
  *H04H 20/93*   (2008.01)
  *H04H 20/72*   (2008.01)

(52) U.S. Cl.
  CPC ............ *H04H 60/70* (2013.01); *H04W 4/024* (2018.02); *H04H 20/72* (2013.01)

(58) Field of Classification Search
  USPC ..................................................... 455/404.2
  See application file for complete search history.

(56) References Cited

OTHER PUBLICATIONS

Y.S. Cho et al., "Disaster Broadcasting System Technologies and Trends in the US", Electronics and Telecommunications Trends. vol. 33, No. 3, Jun. 2018, pp. 51-58, Electronics and Telecommunications Research Institute (ETRI), Republic of Korea.

Chang Jong Hyun et al., "Mobile evacuation map notification when using AEA service based on UHD Broadcasting", Seoul National University of Science and Technology, ETRI, Republic of Korea.

| Syntax | No.Bits | Format |
|---|---|---|
| FIC_segment_header(){ | | |
|     FIC_segment_type | 2 | uimsbf |
|     wake_up_indicator | 2 | uimsbf |
|     FIC_chunk_major_protocol_version | 2 | uimsbf |
|     current_next_indicator | 1 | bslbf |
|     error_indicator | 1 | bslbf |
|     FIC_segment_num | 4 | uimsbf |
|     FIC_last_segment_num | 4 | uimsbf |
| } | | |

| Value | Designation |
|---|---|
| 0x00 | Not specified |
| 0x01 | Wake-up1 |
| 0x02 | Wake-up2 |
| 0x03 | Reserved(Normal A/V) | wake_up_indicator value

FIG. 4A

| Element or Attribute Name | Use | Data Type | Short Description |
|---|---|---|---|
| AEAT | | | Root element of the AEAT |
|   AEA | 1..N | | Advanced Emergency Alert formatted as AEA-MF. |
|     @aeaId | 1 | string | The identifier of AEA message. |
|     @issuer | 1 | string | The identifier of the broadcast station originating or forwarding the message. |
|     @audience | 1 | string | The intended distribution of the AEA message. |
|     @aeaType | 1 | string | The category of the message. |
|     @refAEAId | 0..1 | string | The referenced identifier of AEA message. It shall appear when the @aeaType is "update" or "cancel" and shall not appear when the @aeaType is "alert". |
|     @priority | 0..1 | unsignedByte | The priority of the message. It shall appear when the @aeaType is "alert" or "update" and may appear when the @aeaType is "cancel". |
|     @wakeup | 0..1 | boolean | Indication that this AEA is associated with a wake-up event. |
|     Header | 0..1 | | The container for the basic alert envelope. |
|       @effective | 0..1 | dateTime | The effective time of the AEA message. It appears when the @aeaType is "alert" or "update." If omitted, the default is immediate. |
|       @expires | 0..1 | dateTime | The expiration time of the AEA message. It appears when the @aeaType is "alert" or "update". |
|       EventCode | 0..1 | string | A code identifying the event type of the AEA message. |
|         @type | 0..1 | string | A national-assigned string designating the domain of the code (e.g. SAME in US, ...) |
|       EventDesc | 0..N | string | The short plain text description of the emergency event (e.g. "Tornado Warning" or "Tsunami Warning." |
|         @lang | 1 | lang | The code denoting the language of the respective element of the EventDesc. |
|       Location | 0..N | string | The geographic code delineating the affected area of the AEA message. It appears when the @aeaType is "alert" or "update" and can appear when the @aeaType is |

FIG. 4B

| | | | | |
|---|---|---|---|---|
| | | | | "cancel". |
| | @type | 1 | string | A national-assigned string designating the domain of the code (e.g. FIPS in US or "SGC" in Canada) |
| AEAText | | 0..N | string | Contains the specific text of the emergency notification. It appears when the @aeaType is "alert" or "update" and can appear when the @aeaType is "cancel". |
| | @lang | 1 | lang | The code denoting the language of the respective element of the AEA message text |
| LiveMedia | | 0..1 | | Contains the information of emergency-related live A/V service which is delivered via broadcast stream. |
| | @bsid | 1 | aeat:listOfUnsignedShort | Identifier of the Broadcast Stream contains the emergency-related live A/V service. |
| | @serviceId | 1 | unsignedShort | Integer number that identifies the emergency-related A/V Service. |
| ServiceName | | 0..N | string | A user-friendly name for the service where the LiveMedia is available |
| | @lang | 1 | lang | The language of the text described in the ServiceName element |
| Media | | 0..N | | Contains the component parts of the multimedia resource. |
| | @lang | 0..1 | lang | The code denoting the language of the respective element Media |
| | @mediaDesc | 0..1 | string | Text describing the type and content of the media file |
| | @mediaType | 0..1 | string | Text identifying the intended use of the associated media. |
| 401 → | @url | 1 | anyURI | URL of the media file |
| 402 → | @alternateUrl | 0..1 | anyURI | Alternate URL of the media file when it is also available via non-broadcast delivery (i.e. via the Internet) |
| 403 → | @contentType | 0..1 | string | IANA media type of media content referenced by Media@url |
| | @contentLength | 0..1 | unsignedLong | Size in bytes of media content referenced by Media@url |
| | @mediaAssoc | 0..1 | anyURI | URI of another Media element with which this attribute is associated |

APPARATUS AND METHOD FOR TRANSMITTING SHELTER LOCATION INFORMATION BASED ON ATSC 3.0, AND APPARATUS AND METHOD FOR RECEIVING SHELTER LOCATION INFORMATION BASED ON ATSC 3.0

CROSS REFERENCE TO RELATED APPLICATION

The present application claims priority to Korean Patent Application No. 10-2018-0138403 and 10-2019-0142658, filed Nov. 12, 2018 and Nov. 8, 2019, the entire contents of which is incorporated herein for all purposes by this reference.

BACKGROUND OF THE INVENTION

Field of the Invention

The present disclosure relates to an ATSC 3.0 based next-generation terrestrial broadcasting system and, more particularly, to a method and apparatus for transmitting and receiving disaster information in a next-generation terrestrial broadcasting system.

Description of the Related Art

With the development of mobile devices, transmission and reception of a broadcast signal has become possible for mobile devices. Therefore, a broadcast signal transmission system suitable for a mobile broadcast environment is being constructed. In addition, human and natural disasters are occurring around the world. For these disasters, it is necessary to provide prompt disaster information. In the case of mobile broadcasting, the location where the user receives the broadcast may be variable. Since the disaster is largely related to the location, it is effective to provide information about the disaster through the mobile broadcasting. In view of such a situation, development of a technology for providing information on disasters in a mobile broadcasting system has been made.

SUMMARY OF THE INVENTION

In the mobile broadcasting system, especially ATSC 3.0, it is suggested how to provide disaster information through AEA message in the case of disaster or catastrophe. The AEA messages may include real-time contents and non-real-time contents in addition to disaster information, in which the non-real-time contents can provide data on the basis of the user's location.

However, the broadcasting network is unable to distinguish individual users due to the absence of Uplink and thus cannot provide information suitable for individual users. Therefore, it is not possible to provide an evacuation route for individual users. In addition, in order to transmit and decode data using non-real-time contents items in a broadcasting network, a contents type of IANA is defined and used. However, when a new type of application emerges, there is a problem that a decoding method for this purpose must be newly defined.

An objective of the present disclosure is to provide an apparatus and method of transmitting shelter location information, which may provide a safe evacuation route to the shelter on the basis of the real-time location of the user by providing the shelter location through the non-real-time contents item of AEA message used in ATSC 3.0.

Another technical objective of the present disclosure is to provide an apparatus and method of configuring an AEA message for providing ATSC 3.0 based shelter location information, and an apparatus and method for checking shelter location information using an ATSC 3.0 based AEA message.

Technical objectives to be achieved in the present disclosure are not limited to the above-mentioned technical problems, and other technical problems not mentioned above will be clearly understood by those skilled in the art from the following description.

According to an embodiment of the present disclosure, an apparatus for transmitting shelter location information may be provided. The apparatus includes: a wake-up information checking unit that checks a value of a wake-up indicator provided in a head of a data file to determine whether a disaster has occurred; and a shelter location information insertion unit inserting the shelter location information into an advanced emergency alert table (AEAT), as it is confirmed by the wake-up information checking unit that a disaster has occurred.

According to another embodiment of the present disclosure, a method of transmitting shelter location information may be provided. The method includes: checking a value of a wake-up indicator provided in a head of a data file to determine whether a disaster has occurred; and inserting the shelter location information into an advanced emergency alert table (AEAT), as it is confirmed by the wake-up information checking unit that a disaster has occurred.

According to an embodiment of the present disclosure, an apparatus for receiving shelter location information may be provided. The apparatus includes: a wake-up information checking unit checking a value of a wake-up indicator provided in a head of a data file to determine whether a disaster has occurred; a shelter location information checking unit checking the shelter location information contained in an advanced emergency alert table (AEAT), as it is confirmed by the wake-up information checking unit that a disaster has occurred; and an evacuation route search unit identifying and providing a route from a current location to a shelter using the shelter location information checked by the shelter location information checking unit.

According to another embodiment of the present disclosure, a method of receiving shelter location information may be provided. The method includes: checking a value of a wake-up indicator provided in a head of a data file to determine whether a disaster has occurred; checking the shelter location information contained in an advanced emergency alert table (AEAT), as it is confirmed by the wake-up information checking unit that a disaster has occurred; and identifying and providing a route from a current location to a shelter using the shelter location information checked by the shelter location information checking unit.

The features briefly summarized above with respect to the present disclosure are merely exemplary aspects of the detailed description of the present disclosure described below, and do not limit the scope of the present disclosure.

According to the present disclosure, by providing a shelter location through the non-real-time contents item of the AEA message used in ATSC 3.0, it is possible to provide the apparatus and method of transmitting shelter location information, which can provide a safe evacuation route to the shelter on the basis of the real-time location of the user.

According to the present disclosure, it is possible to provide an apparatus and method of configuring an AEA message for providing ATSC 3.0 based shelter location information, and an apparatus and method of checking shelter location information using an ATSC 3.0 based AEA message.

Effects obtained in the present disclosure are not limited to the above-mentioned effects, and other effects not mentioned above may be clearly understood by those skilled in the art from the following description.

BRIEF DESCRIPTION OF THE DRAWINGS

The above and other objects, features, and other advantages of the present invention will be more clearly understood from the following detailed description when taken in conjunction with the accompanying drawings, in which:

FIGS. 4A and 4B are diagrams illustrating an AEAT message structure used in a transmission apparatus and reception apparatus of shelter location information according to an embodiment of the present disclosure.

DETAILED DESCRIPTION OF THE INVENTION

Hereinbelow, exemplary embodiments of the present disclosure will be described in detail with reference to the accompanying drawings such that the present disclosure can be easily embodied by one of ordinary skill in the art to which this invention belongs. However, the present disclosure may be variously embodied, without being limited to the exemplary embodiments.

In the description of the present disclosure, the detailed descriptions of known constitutions or functions thereof may be omitted if they make the gist of the present disclosure unclear. Also, portions that are not related to the present disclosure are omitted in the drawings, and like reference numerals designate like elements.

In the present disclosure, when an element is referred to as being "coupled to", "combined with", or "connected to" another element, it may be connected directly to, combined directly with, or coupled directly to another element or be connected to, combined directly with, or coupled to another element, having the other element intervening therebetween. Also, it should be understood that when a component "includes" or "has" an element, unless there is another opposite description thereto, the component does not exclude another element but may further include the other element.

In the present disclosure, the terms "first", "second", etc. are only used to distinguish one element, from another element. Unless specifically stated otherwise, the terms "first", "second", etc. do not denote an order or importance. Therefore, a first element of an embodiment could be termed a second element of another embodiment without departing from the scope of the present disclosure. Similarly, a second element of an embodiment could also be termed a first element of another embodiment.

In the present disclosure, components that are distinguished from each other to clearly describe each feature do not necessarily denote that the components are separated. That is, a plurality of components may be integrated into one hardware or software unit, or one component may be distributed into a plurality of hardware or software units. Accordingly, even if not mentioned, the integrated or distributed embodiments are included in the scope of the present disclosure.

In the present disclosure, components described in various embodiments do not denote essential components, and some of the components may be optional. Accordingly, an embodiment that includes a subset of components described in another embodiment is included in the scope of the present disclosure. Also, an embodiment that includes the components described in the various embodiments and additional other components are included in the scope of the present disclosure.

Hereinafter, embodiments of the present disclosure will be described with reference to the accompanying drawings.

Figure 1:
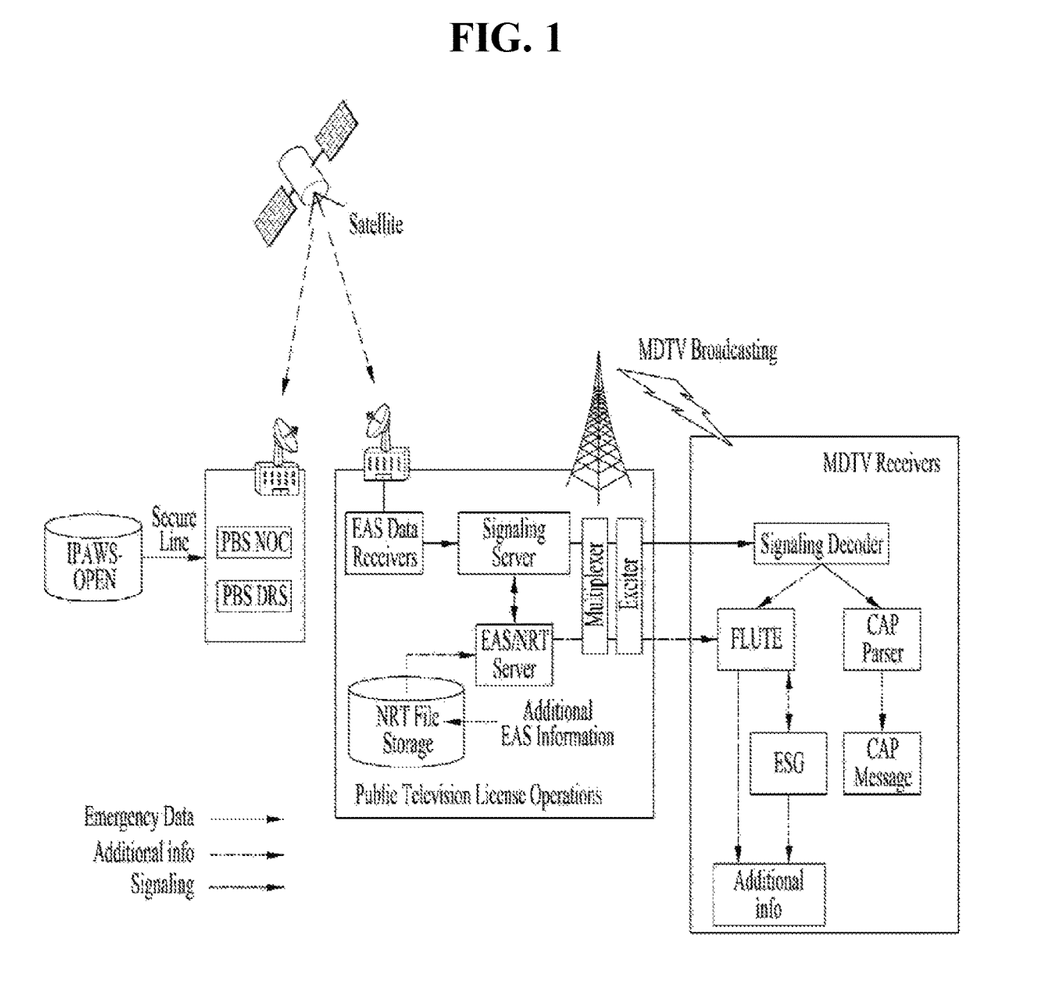
FIG. 1 is a diagram illustrating an emergency alert system to which a transmission apparatus and reception apparatus of shelter location information are applied according to an embodiment of the present disclosure.

FIG. 1 is a diagram illustrating an emergency alert system to which a transmission apparatus and reception apparatus of shelter location information are applied according to an embodiment of the present disclosure.

The public broadcasting service (PBS) obtains an emergency alert message through a secure line from an integrated public alert and warning system (IPAWS)-OPEN and sends the message to a local PBS station through a satellite network. The emergency alert message delivered to the local PBS station is made as a mobile emergency alert table by a mobile digital television (MDTV) signaling server, and the mobile emergency alert table is sent to a MDTV network through a multiplexer and an exciter.

When the MDTV receiver receives such a signal, the MDTV receiver parses the mobile emergency alert cable using the signaling decoder and parses the emergency alert message existing inside the mobile emergency alert table, thereby extracting the characters of the emergency alert message to be displayed on the screen.

A flow of additional information on the emergency alert message through the NRT may proceed as follows.

As the first method, the local PBS station creates additional information files related to disaster and stores the same in the NRT file repository used by the MDTV NRT server, and the MDTV NRT server creates signaling information related to the files stored in the NRT file storage and transmits the files in non-real time. This file is also transmitted over the MDTV network using the multiplexer and the exciter, and the broadcast receiver may find information on files transmitted to the NRT using the FLUTE/ESG function to receive the file, and then display the information on the screen of the broadcast receiver.

As the second method, the NRT file is not generated at each local PBS station, but is sent including the URI information indicating additional information inside the CAP message when an emergency alert message is issued from IPAWS-OPEN.

Herein, a <uri> element that is a sub element of a <resource> element of the CAP may be used. The MDTV signaling server extracts the URI information of the CAP message to obtain a resource file, which is transmitted through the MDTV network through the NRT. The flow that follows is the same as the first method described above.

The emergency alert message recipients of the mobile emergency alert system may be divided into public users and non-public users. The non-public users are defined as first responders. The first responder refers to those who have the capacity to handle each disaster. For example, in the event of a fire, 911 would be the first responder. The mobile emergency alert table defines a type of receiver/receiver to which an emergency alert message should be delivered and also defines in what discipline the emergency alert message should be delivered when the receiver is a first responder.

Figure 2:
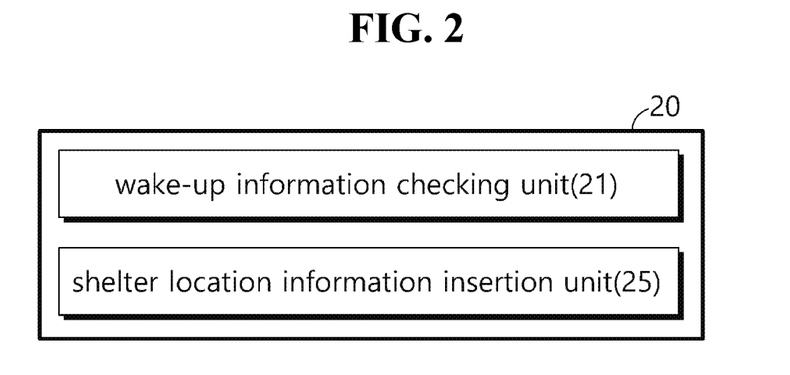
FIG. 2 is a block diagram illustrating a configuration of an apparatus for transmitting shelter location information shelter according to an embodiment of the present disclosure.

FIG. 2 is a block diagram illustrating a configuration of an apparatus for transmitting shelter location information according to an embodiment of the present disclosure.

The apparatus 20 for transmitting shelter location information according to an embodiment of this disclosure may include a wake-up information checking unit 21 and a shelter location information insertion unit 25.

Figure 3:
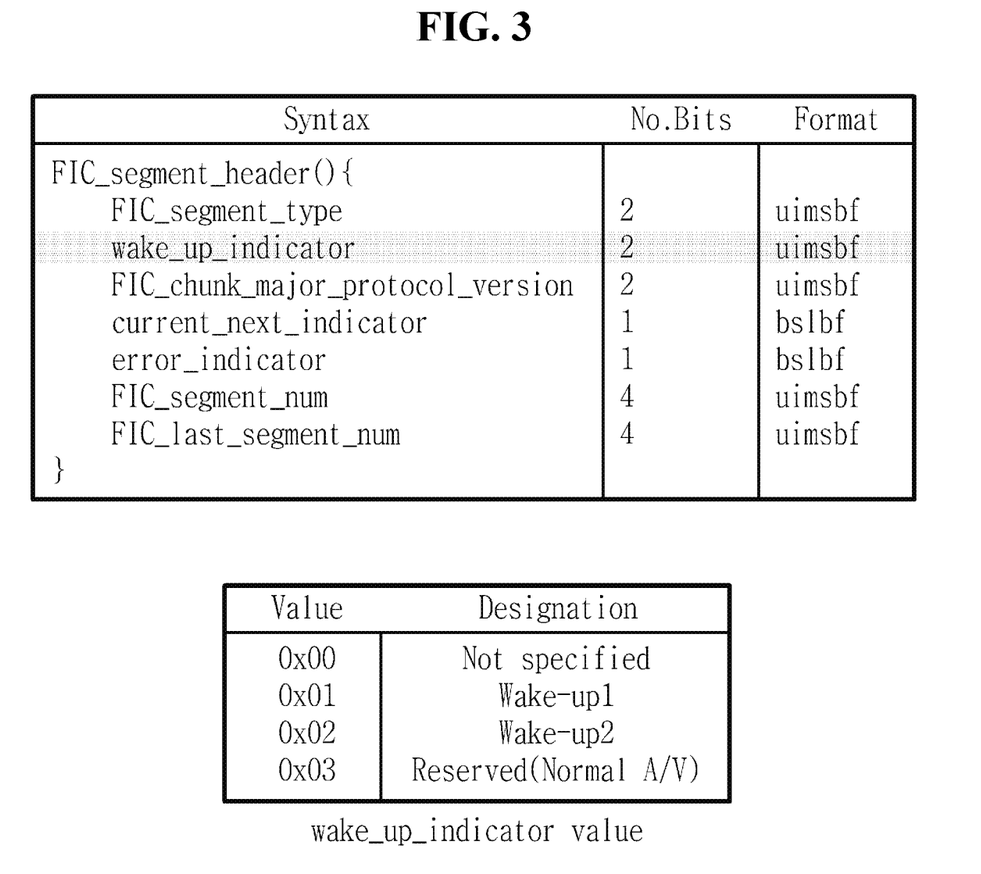
FIG. 3 is a diagram illustrating a structure of values of an FIC segment head and a wake-up indicator used in a transmission apparatus and reception apparatus of shelter location information according to an embodiment of the present disclosure.

First, the wake-up information checking unit 21 may process bootstrapping in a PHY layer and check the value of the wake-up indicator included in a FIC segment head to determine whether a disaster has occurred. For example, as illustrated in FIG. 3, when the value of the wake-up indicator is set to 0x00, it may be confirmed that no disaster has occurred, and when the value of the wake-up indicator is set to 0x01, 0x02, 0x03, or the like, it may be confirmed that disasters have occurred.

When it is determined that a disaster has occurred, the wake-up information checking unit 21 may make a request for an operation of the shelter location information insertion unit 25. In response, the shelter location information insertion unit 25 may check the location information of the shelter and insert the information into an AEAT.

In detail, the shelter location information insertion unit 25 may decode L1 signaling to check a flag of a PLP, and decode the PLP of the corresponding flag to acquire an AEAT in which LLS_table_id is set to 0x04. Herein, the AEAT may be illustrated as shown in FIGS. 4A and 4B. The shelter location information insertion unit 25 may check URL information including the shelter location information. Herein, the shelter location information may be configured in a JSON file format or an XML file format. Next, the shelter location information insertion unit 25 may insert the checked URL information into the AEAT, and in particular, into a "@url" block 401 or a "@alternateUrl" block 402 of the media container. Furthermore, the block into which the URL information is inserted may be set on the basis of the availability of the broadcasting network. For example, when the shelter location information may be transmitted through the broadcasting network, the shelter location information insertion unit 25 may insert the URL information into the "@url" block 401. Meanwhile, when the shelter location information may not be transmitted through the broadcasting network, the URL information may be transmitted through a network (for example, internet network) other than the broadcasting network. Herein, the shelter location information insertion unit 25 may insert the URL information into the "@alternateUrl" block 402.

Figure 5:
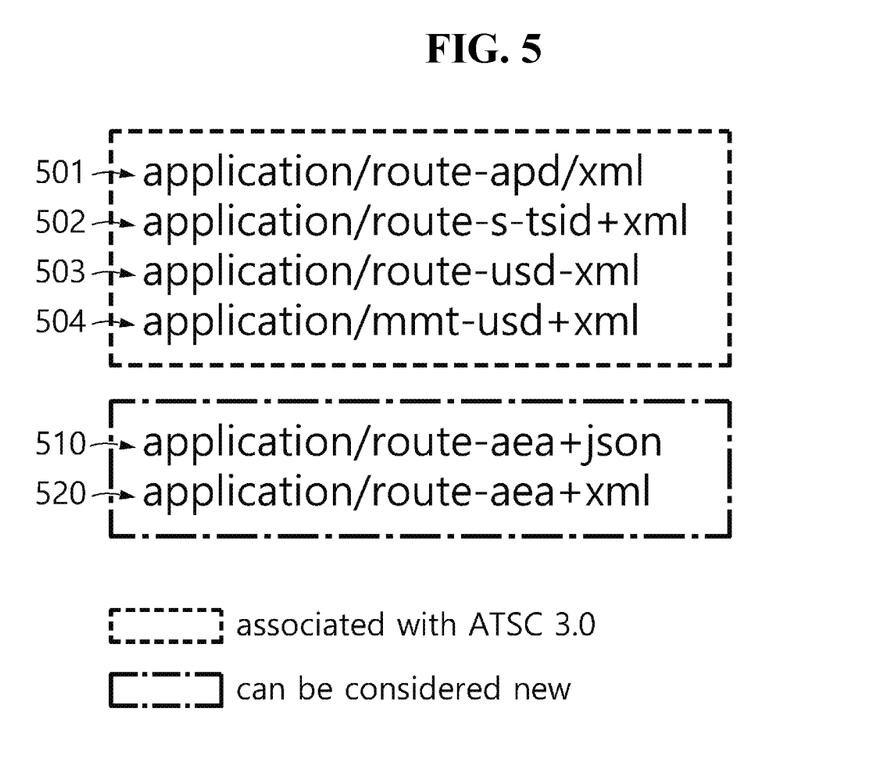
FIG. 5 is a diagram illustrating file format information used in a "contents type" block of a media container used in a transmission apparatus and reception apparatus of shelter location information according to an embodiment of the present disclosure.

Furthermore, the shelter location information may be configured in various file formats. In consideration of this, the shelter location information insertion unit 25 may further insert information capable of identifying the file format configuring the shelter location information into the AEAT. For example, the shelter location information insertion unit 25 may insert the information identifying the file format into a "contents type" block 403 of the media container. The information identifying the file format may be illustrated as shown in FIG. 5. Since the "contents type" block 403 is defined in ATSC 3.0, a detailed description of the predefined attributes 501, 502, 503, and 504 is associated with the specification of ATSC 3.0. The shelter location information insertion unit 25 may include the information identifying the file format in the "contents type" block 403, the information including an identifier (e.g., "route-aea") capable of identifying information about the shelter site and an identifier (e.g., "JSON" or "XML") identifying the file format. On the basis of this, when the file format in which the shelter location information is configured in "JSON", the shelter location information insertion unit 25 inserts the first identifier, that is, "application/route-aea+json" 510 into the "contents type" block 403, and when the file format is configured in "XML", the shelter location information insertion unit 25 inserts a second identifier, that is, "application/route-aea+xml" 520 into the "contents type" block 403.

Figure 6:
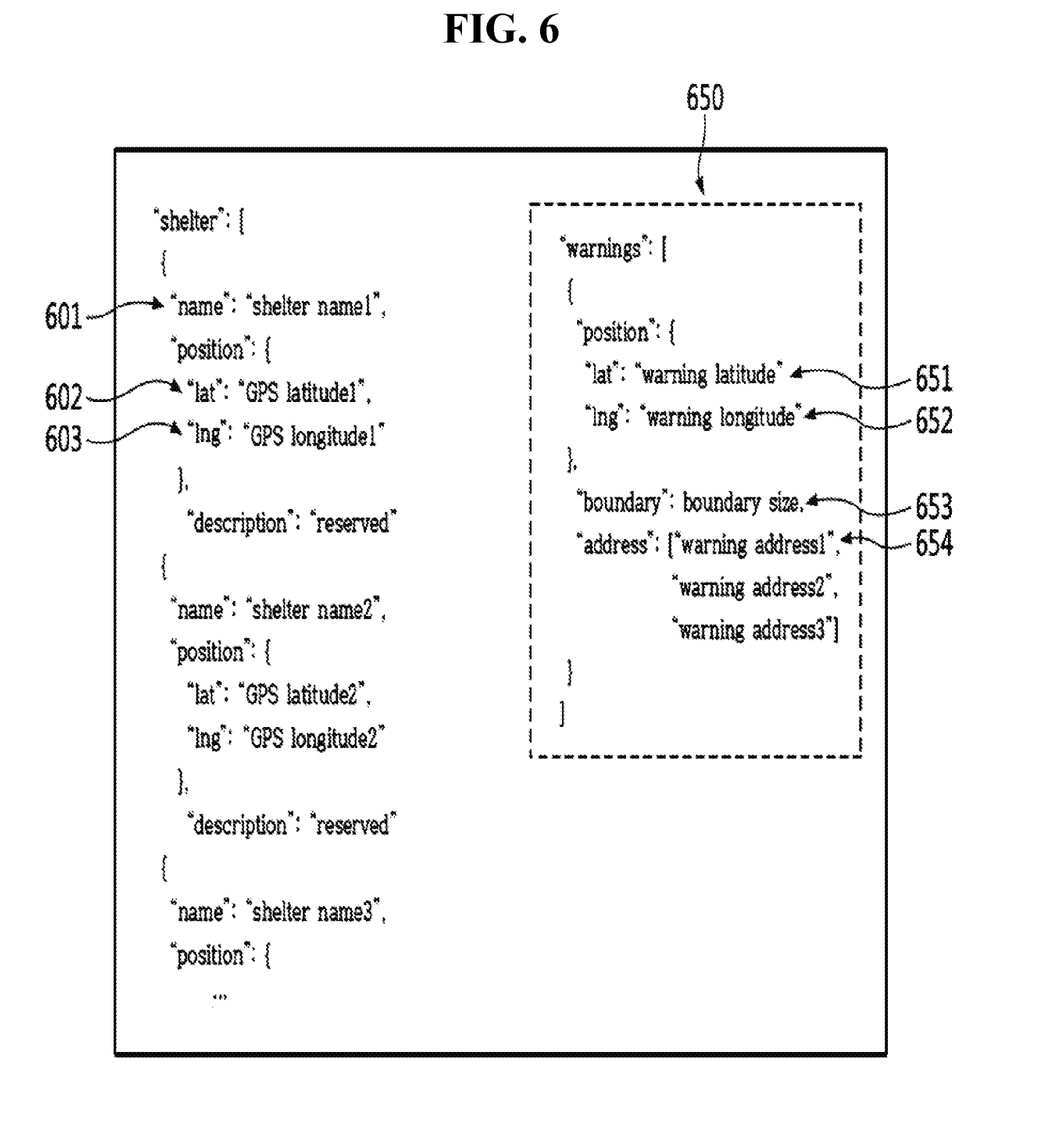
FIG. 6 is a diagram illustrating the shelter location information used in an apparatus for transmitting shelter location information according to an embodiment of the present disclosure.

Meanwhile, FIG. 6 is a diagram illustrating the shelter location information used in the apparatus for transmitting the shelter location information according to an embodiment of the present disclosure.

FIG. 6 illustrates that the shelter location information is configured in a JSON file format. Referring to FIG. 6, the shelter location information includes a shelter name 601 which may be written in characters, and a GPS latitude 602 and a GPS longitude 603 of the shelter, which may specify the location of each shelter.

In addition, the shelter location information may further include information about the area (hereinafter referred to as "unusable area information") 650 including the road that may not be used due to disaster or catastrophe. The unusable area information may include the latitude and longitude 651 and 652 of the center portion of the unusable area. In addition, the unusable area information may further include a boundary size 653 of the unusable area and a warning address 654 capable of identifying the unusable road.

Figure 7:
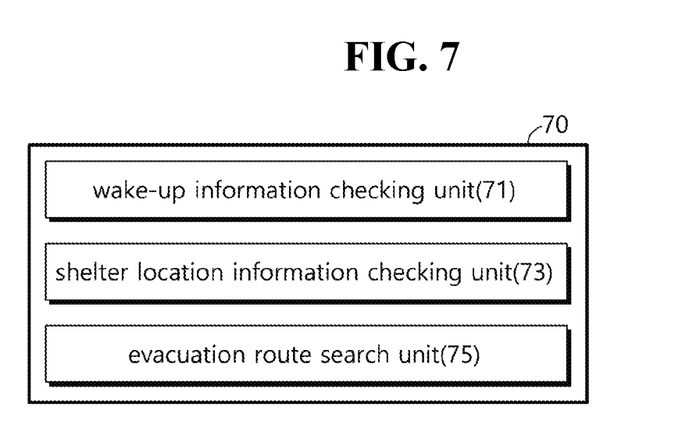
FIG. 7 is a block diagram illustrating a configuration of an apparatus for receiving shelter location information according to an embodiment of the present disclosure.

FIG. 7 is a block diagram illustrating a configuration of an apparatus for receiving shelter location information according to an embodiment of the present disclosure.

An apparatus 70 for receiving shelter location information according to an embodiment of the present disclosure may include a wake-up information checking unit 71, a shelter location information checking unit 73, and an evacuation route search unit 75.

First, the wake-up information checking unit 71 may process bootstrapping in a PHY layer and check a value of a wake-up indicator included in a FIC segment head to determine whether a disaster has occurred. For example, as illustrated in FIG. 3, when the value of the wake-up indicator is set to 0x00, it may be confirmed that no disaster has occurred, and when the value of the wake-up indicator is set to 0x01, 0x02, 0x03, or the like, it may be confirmed that a disaster has occurred.

When it is determined that a disaster has occurred, the wake-up information checking unit 71 may make a request for an operation of the shelter location information checking unit 73. In response, the shelter location information checking unit 73 may check the shelter location information by confirming an AEAT.

In detail, the shelter location information checking unit 73 may decode L1 signaling to check a flag of the PLP, and decode the PLP of the corresponding flag to acquire an AEAT in which LLS_table_id is set to 0x04. Herein, the AEAT may be illustrated as shown in FIGS. 4A and 4B. In addition, the shelter location information checking unit 73 may obtain the shelter location information on the basis of URL information contained in a "@url" block 401 or a "@alternateUrl" block 402 of the media container in the AEAT. That is, the shelter location information checking unit 73 checks the URL information contained in the "@url" block 401 or the "@alternateUrl" block 402 of the media container in the AEAT, and receive data containing the shelter location information from the checked URL information. Herein, the received data may be configured in a variety of file formats, for example, JSON file format or XML file format, and the shelter location information checking unit 73 may check the information that identifies the file format contained in the "Contents type" block 403 of the media container. The shelter location information checking unit 73 may check that the file format of the shelter location information is configured in "JSON", when the identifier contained in the "contents type" block 403 is a first identifier, that is, "application/route-aea+json" 510, and the shelter location information checking unit 73 may check that the file format is configured in "XML", when the identifier is a second identifier, that is, "application/route-aea+xml" 520.

Through the above-described operation, the shelter location information checking unit 73 can receive the data containing the shelter location information and check the file format of the received data, thereby checking the data contained on the basis of the checked file format. For example, when the file format of the received data is configured in the JSON file format (see FIG. 6), it is possible to confirm a shelter name 601 that may be written in characters contained in the JSON file format, and a GPS latitude 602 and a GPS longitude 603 of the shelter, which may specify the location of each shelter.

In addition, the shelter location information checking unit 73 may further check the information (hereinafter referred to as "unusable area information") 650 about the area including the road that cannot be used due to disaster or catastrophe. The unusable area information may include the latitude and longitude 651 and 652 of the center portion of the unusable area. In addition, the unusable area information may further include a boundary size 653 of the unusable area and a warning address 654 capable of identifying the unusable road.

Meanwhile, the evacuation route search unit 75 may detect and provide a route from the current location to the nearest shelter using the location information of the shelter identified by the shelter location information checking unit 73. For example, the evacuation route search unit 75 may call an application that performs route search, for example, a map application, provide location information for at least one shelter through the map application, and make a request for an evacuation route. Correspondingly, the map application may check the shelter location information and the current location information of the receiving apparatus, and identify each route from the current location information to at least one shelter. In addition, the shelters may be arranged in order of relatively proximity to the current location. Herein, the map application may provide a route to a shelter that is the nearest, or may provide a route to at least one shelter sequentially arranged.

In addition, the evacuation route search unit 75 may also provide unusable area information when providing the shelter location information. In response, the map application may identify the evacuation route by reflecting the unusable area information.

Figure 8:
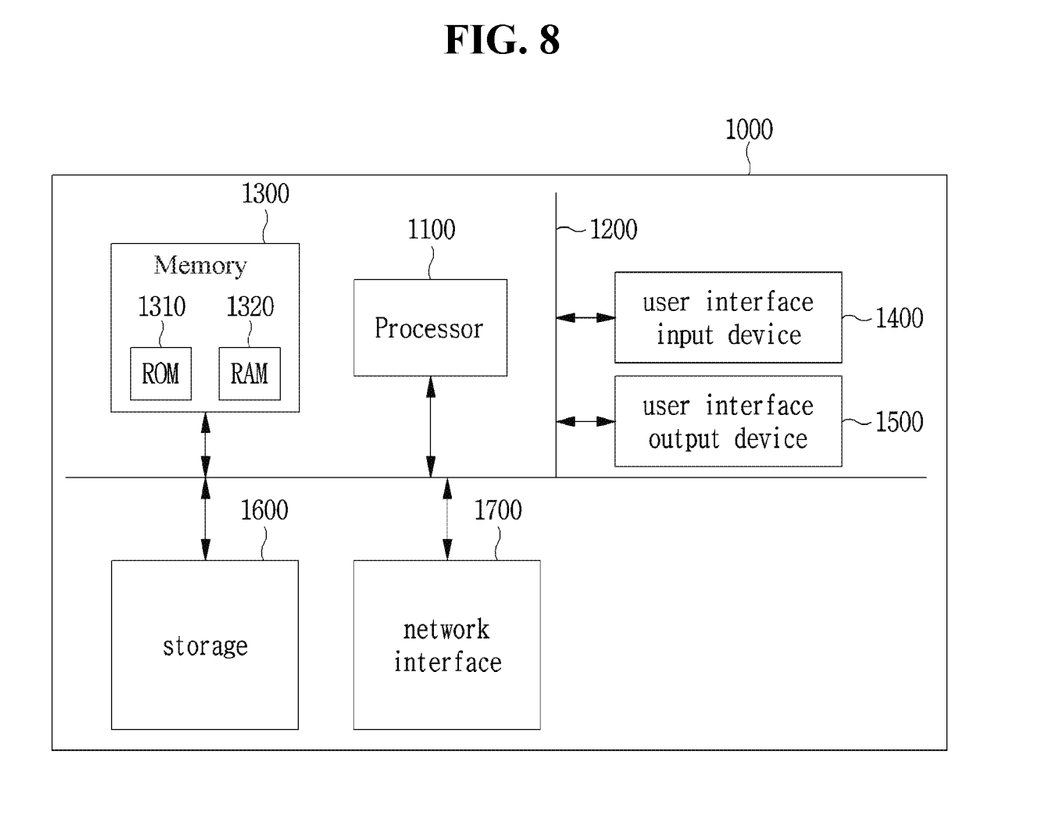
FIG. 8 is a block diagram illustrating a transmission apparatus and reception apparatus of shelter location information, and a computing system for executing a transmission method and reception method of shelter location information according to an embodiment of the present disclosure.

FIG. 8 is a block diagram illustrating a transmission apparatus and reception apparatus of shelter location information, and a computing system for executing a transmission method and reception method of shelter location information according to an embodiment of the present disclosure.

Referring to FIG. 8, a computing system 100 may include at least one processor 1100 connected through a bus 1200, a memory 1300, a user interface input device 1400, a user interface output device 1500, a storage 1600, and a network interface 1700.

The processor 1100 may be a central processing unit or a semiconductor device that processes commands stored in the memory 1300 and/or the storage 1600. The memory 1300 and the storage 1600 may include various volatile or nonvolatile storing media. For example, the memory 1300 may include a ROM (Read Only Memory) and a RAM (Random Access Memory).

Accordingly, the steps of the method or algorithm described in relation to the embodiments of the present disclosure may be directly implemented by a hardware module and a software module, which are operated by the processor 1100, or a combination of the modules. The software module may reside in a storing medium (that is, the memory 1300 and/or the storage 1600) such as a RAM memory, a flash memory, a ROM memory, an EPROM memory, an EEPROM memory, a register, a hard disk, a detachable disk, and a CD-ROM. The exemplary storing media are coupled to the processor 1100 and the processor 1100 can read out information from the storing media and write information on the storing media. Alternatively, the storing media may be integrated with the processor 1100. The processor and storing media may reside in an application specific integrated circuit (ASIC). The ASIC may reside in a user terminal. Alternatively, the processor and storing media may reside as individual components in a user terminal.

The exemplary methods described herein were expressed by a series of operations for clear description, but it does not limit the order of performing the steps, and if necessary, the steps may be performed simultaneously or in different orders. In order to achieve the method of the present disclosure, other steps may be added to the exemplary steps, or the other steps except for some steps may be included, or additional other steps except for some steps may be included.

Various embodiments described herein are provided to not arrange all available combinations, but explain a representative aspect of the present disclosure and the configurations about the embodiments may be applied individually or in combinations of at least two of them.

Further, various embodiments of the present disclosure may be implemented by hardware, firmware, software, or combinations thereof. When hardware is used, the hardware may be implemented by at least one of ASICs (Application Specific Integrated Circuits), DSPs (Digital Signal Processors), DSPDs (Digital Signal Processing Devices), PLDs (Programmable Logic Devices), FPGAs (Field Programmable Gate Arrays), a general processor, a controller, a micro controller, and a micro-processor.

The scope of the present disclosure includes software and device-executable commands (for example, an operating system, applications, firmware, programs) that make the method of the various embodiments of the present disclosure executable on a machine or a computer, and non-transitory computer-readable media that keeps the software or commands and can be executed on a device or a computer.

What is claimed is:

1. An apparatus for transmitting shelter location information, the apparatus comprising:
    a wake-up information checking unit that checks a value of a wake-up indicator provided in a head of a data file to determine whether a disaster has occurred; and
    a shelter location information insertion unit inserting the shelter location information into an advanced emergency alert table (AEAT), as it is confirmed by the wake-up information checking unit that a disaster has occurred,
    wherein the shelter location information insertion unit checks URL information containing the shelter location information and inserts the checked URL information into a URL block of a media container included in the AEAT,
    wherein the wake-up information checking unit processes bootstrapping in a physical (PHY) layer to check a value of a wake-up indicator provided in a FIC segment head, determines that no disaster has occurred when the value of the wake-up indicator is set to 0x00, and determines that the disaster has occurred when the value of the wake-up indicator is set to 0x01, 0x02, or 0x03.

2. An apparatus for transmitting shelter location information, the apparatus comprising:
    a wake-up information checking unit that checks a value of a wake-up indicator provided in a head of a data file to determine whether a disaster has occurred; and
    a shelter location information insertion unit inserting the shelter location information into an advanced emergency alert table (AEAT), as it is confirmed by the wake-up information checking unit that a disaster has occurred,
    wherein the wake-up information checking unit processes bootstrapping in a physical (PHY) layer to check a value of a wake-up indicator provided in a FIC segment head, determines that no disaster has occurred when the value of the wake-up indicator is set to 0x00, and determines that the disaster has occurred when the value of the wake-up indicator is set to 0x01, 0x02, or 0x03,
    wherein the shelter location information insertion unit checks URL information containing the shelter location information and inserts the checked URL information into an alternateUrl block of the media container included in the AEAT.

3. The apparatus of claim 1, wherein the shelter location information insertion unit inserts a file format identifier for identifying a file format of data containing the shelter location information into a contentType block of a media container included in the AEAT.

4. The apparatus of claim 3, wherein the file format includes an XML file format or a JSON file format.

5. The apparatus of claim 1, wherein the wake-up information checking unit determines whether a disaster has occurred, on the basis of the value of the wake-up indicator.

6. The apparatus of claim 1, wherein the shelter location information includes a shelter name capable of being written in characters, and a GPS latitude and a GPS longitude capable of specifying a location of each shelter.

7. The apparatus of claim 1, wherein the shelter location information includes at least of a latitude and longitude for a center portion of an unusable area, a size of the unusable area, and an address of the unusable area capable of identifying the unusable area.

8. A method of transmitting shelter location information, the method comprising:
    checking a value of a wake-up indicator provided in a head of a data file to determine whether a disaster has occurred; and
    inserting the shelter location information into an advanced emergency alert table (AEAT), as it is confirmed by the wake-up information checking unit that a disaster has occurred,
    wherein the inserting the shelter location information includes:
        checking URL information containing the shelter location information, and
        inserting the checked URL information into a URL block of a media container included in the AEAT,
    wherein the checking the value of the wake-up indicator includes:
        processing bootstrapping in a physical (PHY) layer to check a value of a wake-up indicator provided in a FIC segment head,
        determining that no disaster has occurred when the value of the wake-up indicator is set to 0x00, and
        determining that the disaster has occurred when the value of the wake-up indicator is set to 0x01, 0x02, or 0x03.

9. An apparatus for receiving shelter location information, the apparatus comprising:
    a wake-up information checking unit checking a value of a wake-up indicator provided in a head of a data file to determine whether a disaster has occurred;
    a shelter location information checking unit checking the shelter location information contained in an advanced emergency alert table (AEAT), as it is confirmed by the wake-up information checking unit that a disaster has occurred; and
    an evacuation route search unit identifying and providing a route from a current location to a shelter using the shelter location information checked by the shelter location information checking unit,
    wherein the shelter location information checking unit checks URL information in a URL block of a media container included in the AEAT and receives data containing the shelter location information from the checked URL,
    wherein the wake-up information checking unit processes bootstrapping in a physical (PHY) layer to check a value of a wake-up indicator provided in a FIC segment head, determines that no disaster has occurred when the value of the wake-up indicator is set to 0x00, and determines that the disaster has occurred when the value of the wake-up indicator is set to 0x01, 0x02, or 0x03.

10. An apparatus for receiving shelter location information, the apparatus comprising:

a wake-up information checking unit checking a value of a wake-up indicator provided in a head of a data file to determine whether a disaster has occurred;

a shelter location information checking unit checking the shelter location information contained in an advanced emergency alert table (AEAT), as it is confirmed by the wake-up information checking unit that a disaster has occurred; and an evacuation route search unit identifying and providing a route from a current location to a shelter using the shelter location information checked by the shelter location information checking unit, wherein the shelter location information checking unit checks URL information contained in a alternateUrl block of a media container in the AEAT, and receives data containing the shelter location information from the checked URL, wherein the wake-up information checking unit processes bootstrapping in a physical (PHY) layer to check a value of a wake-up indicator provided in a FIC segment head, determines that no disaster has occurred when the value of the wake-up indicator is set to 0x00, and determines that the disaster has occurred when the value of the wake-up indicator is set to 0x01, 0x02, or 0x03.

11. The apparatus of claim 9, wherein the shelter location information checking unit identifies a file format identifier contained in a "contents type" block of the media container, and checks a data format of the data containing the shelter location information.

12. The apparatus of claim 9, wherein the shelter location information includes a shelter name capable of being written in characters, and a GPS latitude and a GPS longitude of the shelter, capable of specifying the location of each shelter.

13. The apparatus of claim 9, wherein the evacuation route search unit identifies at least one route corresponding to each of at least one shelter from a current location, and arranges and provides the at least one route on the basis of distance.

14. The apparatus of claim 9, wherein the shelter location information includes at least of a latitude and longitude for a center portion of an unusable area, a size of the unusable area, and an address of the unusable area capable of identifying the unusable area.

15. The apparatus of claim 14, wherein the evacuation route search unit identifies at least one route corresponding to each of at least one shelter from the current location except for the unusable area, and arranges and provides the at least one route on the basis of distance.

16. A method of receiving shelter location information, the method comprising:

checking a value of a wake-up indicator provided in a head of a data file to determine whether a disaster has occurred;

checking the shelter location information contained in an advanced emergency alert table (AEAT), as it is confirmed by the wake-up information checking unit that a disaster has occurred; and identifying and providing a route from a current location to a shelter using the shelter location information checked by the shelter location information checking unit, wherein checking the shelter location information includes:
   checking URL information in a URL block of a media container included in the AEAT and
   receiving data containing the shelter location information from the checked URL, wherein the checking the value of the wake-up indicator includes:
   processing bootstrapping in a physical (PHY) layer to check a value of a wake-up indicator provided in a FIC segment head,
   determining that no disaster has occurred when the value of the wake-up indicator is set to 0x00, and
   determining that the disaster has occurred when the value of the wake-up indicator is set to 0x01, 0x02, or 0x03.

17. A method of receiving shelter location information, the method comprising:

checking a value of a wake-up indicator provided in a head of a data file to determine whether a disaster has occurred;

checking the shelter location information contained in an advanced emergency alert table (AEAT), as it is confirmed by the wake-up information checking unit that a disaster has occurred; and identifying and providing a route from a current location to a shelter using the shelter location information checked by the shelter location information checking unit, wherein the checking of the shelter location information includes:

checking URL information contained in a alternateUrl block of a media container in the AEAT; and receiving data containing the shelter location information from the checked URL information, wherein the checking the value of the wake-up indicator includes:
   processing bootstrapping in a physical (PHY) layer to check a value of a wake-up indicator provided in a FIC segment head,
   determining that no disaster has occurred when the value of the wake-up indicator is set to 0x00, and
determining that the disaster has occurred when the value of the wake-up indicator is set to 0x01, 0x02, or 0x03.

* * * * *